July 12, 1966 R. RICCIUS 3,260,484
CUT-OUT DEVICES FOR LIFTING POWER UNITS OF VTOL AIRCRAFT
Filed Sept. 25, 1964 2 Sheets-Sheet 1

INVENTOR:
ROLF RICCIUS
BY *Otto John Munoz*
Attorney

United States Patent Office 3,260,484
Patented July 12, 1966

3,260,484
CUT-OUT DEVICES FOR LIFTING POWER UNITS OF VTOL AIRCRAFT
Rolf Riccius, Berlin-Mariendorf, Germany, assignor to Vereinigte Flugtechnische Werke Gesellschaft mit beschrankter Haftung frueher "Weser" Flugzeugbau/Focke-Wulf/Heinkel-Flugzeugbau, Bremen-Flughafen, Germany
Filed Sept. 25, 1964, Ser. No. 399,191
1 Claim. (Cl. 244—55)

The present invention concerns cut-out devices for lifting power units of VTOL aircraft.

Various types of power units for VTOL aircraft are known. Apart from power units equipped with pivotal nozzles which optionally supply a horizontal or vertical thrust, there are also such which act purely as lifting power units. Depending upon the layout of the aircraft concerned an arrangement is known whereby the power unit is mentioned in the fuselage, for example, in front or behind the centre of gravity, or symmetrically relative to the longitudinal axis or in the nacelles on either side of the fuselage on the wings or on the wing tips.

A common feature of all these arrangements is that when one such power unit fails, the power unit diametrically opposite relative to the centre of gravity of the aircraft has to be cut out immediately, otherwise tilting movements of the aircraft would be caused owing to the asymmetrical thrust which, in certain circumstances, could not be counterbalanced.

In accordance with the present invention it is proposed to cause the diametrically opposite power units to be cut out forcibly by the fact that the fuel supply devices of each power unit are driven by the diametrically opposite power unit. This causes the fuel supply of the diametrically opposite power unit to be simultaneously interrupted automatically when a power unit fails.

Figure 1:
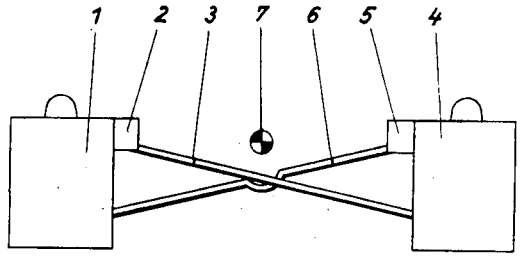

The invention will now be described further, by way of example, with reference to the accompanying drawings, in which:

FIG. 1 shows an arrangement having two power units arranged in front and behind the centre of gravity 7 of an aircraft. A power unit 1 drives a fuel pump 2 which feeds fuel by means of a fuel pipe 3 to a power unit 4 which, in turn, drives a fuel pump 5 feeding the power unit 1 by means of a fuel pipe 6.

Figure 2:
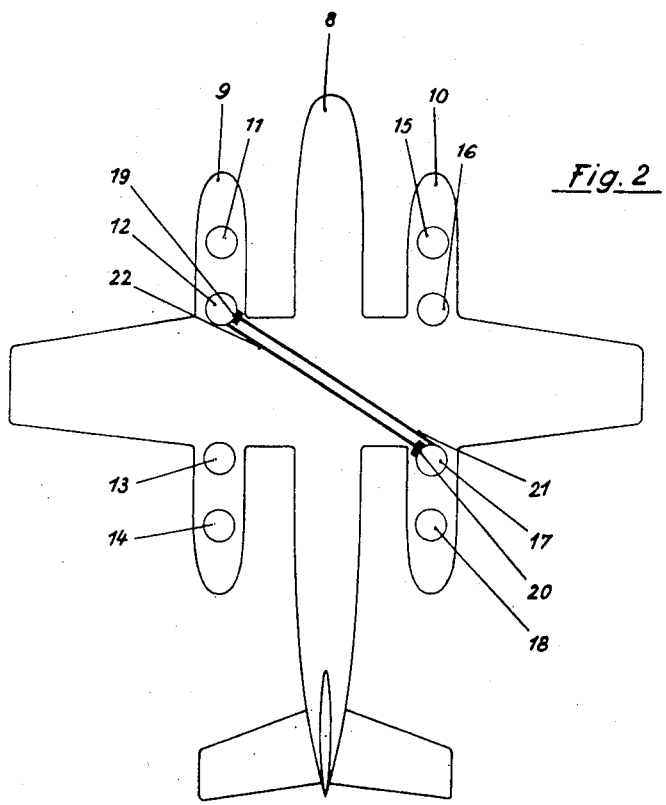

FIGS. 2 shows an alternative embodiment of an aircraft 8 having, for example, eight lifting power units 11, 12, 13, 14, 15, 16, 17 in nacelles 9 and 10 arranged on both sides of the fuselage on the wing. For clarity only two such controlled cut-out systems are shown. A fuel pump 19, driven by the power unit 12, feeds the fuel by means of a pipe 21 to the power unit 17. A fuel pump 20 driven thereby feeds the fuel to the power unit 12 by means of a fuel pipe 22.

Figure 3:
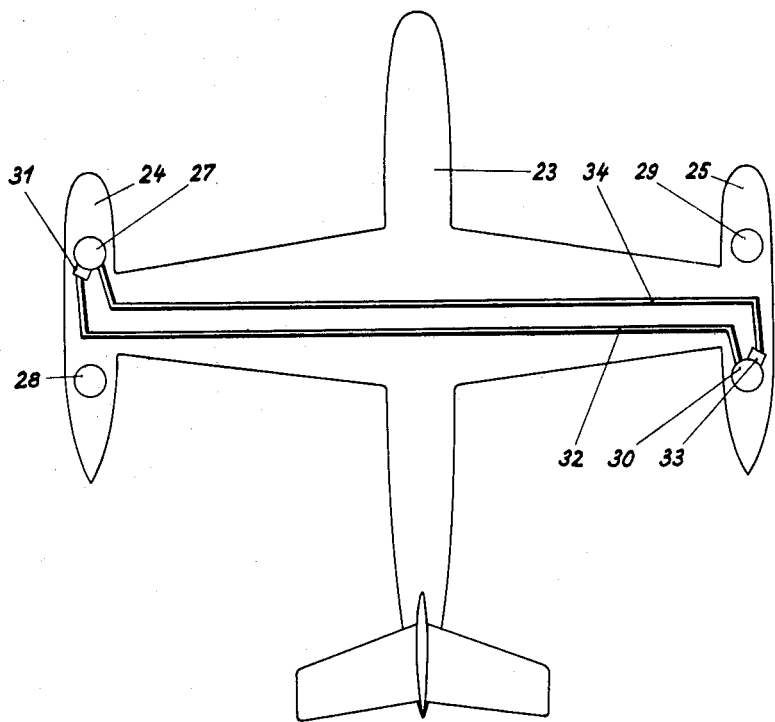

FIG. 3 shown an aircraft having lifting power unit nacelles 24 and 25 mounted on the wing tips, each having, two lifting power units 27, 28, 29, 30 as shown. For clarity one pair of cut-out devices is shown. A fuel pump 31, driven by the power unit 27, feeds the fuel to the power unit 30 by means of a fuel pipe 32. A fuel pump 33, driven by the unit 30 feeds the fuel to the power unit 27 by means of a fuel pipe 34.

I claim:
In a VTOL aircraft, a cut-out device for lifting power units operatively connected in pairs, having means for automatically cutting out the lifting power unit arranged on the diametrically opposite side of the centre of gravity of the aircraft when the other power unit fails, said means comprising a fuel supply device for each power unit driven by the diametrically opposite power unit so that in the event of one of the lifting power units failing, undesirable tilting movements of the aircraft are eliminated.

References Cited by the Examiner
UNITED STATES PATENTS

| | | | |
|---|---|---|---|
| 3,173,628 | 3/1965 | Marchant et al. | 244—12 |
| 3,175,787 | 3/1965 | Boue et al. | 60—39.15 |

MILTON BUCHLER, Primary Examiner.
L. C. HALL, Assistant Examiner.